United States Patent [19]
Whittaker et al.

[11] Patent Number: 5,794,912
[45] Date of Patent: Aug. 18, 1998

[54] CONSTANT HORIZONTAL NATURAL FREQUENCY VIBRATION ISOLATION MOUNT PAD INSERT

[75] Inventors: Wayne H. Whittaker, Horton; Kevin C. Putman; John R. Richter, both of Jackson, all of Mich.

[73] Assignee: Unisorb, Inc., Jackson, Mich.

[21] Appl. No.: 803,081

[22] Filed: Feb. 20, 1997

[51] Int. Cl.[6] .................... F16M 11/24; F16F 7/00
[52] U.S. Cl. .................... 248/638; 248/634; 248/188.4; 248/650; 248/677; 267/141; 267/136
[58] Field of Search .................... 248/634, 188.4, 248/562, 603, 615, 619, 632, 633, 636, 638, 677, 649, 650; 267/141, 153, 136

[56] References Cited

U.S. PATENT DOCUMENTS

| | | | |
|---|---|---|---|
| 3,477,674 | 11/1969 | Schaller | 248/615 |
| 3,592,423 | 7/1971 | Mui | 248/188.4 X |
| 3,838,850 | 10/1974 | Chorkey | 267/141 |
| 4,846,436 | 7/1989 | Young et al. | 248/188.4 X |
| 4,930,741 | 6/1990 | Young et al. | 248/638 X |
| 5,577,703 | 11/1996 | Young | 248/188.4 X |

OTHER PUBLICATIONS

Unisorb Installation Technologies, "Master Catalog and Engineering Guide", 1996, pp. 4-7, Unisorb Installation Technologies, PO Box 1000, Jackson, MI 49204-1000, USA.

*Primary Examiner*—Leslie A. Braun
*Assistant Examiner*—Stephen S. Wentsler
*Attorney, Agent, or Firm*—Young & Basile, P.C.

[57] ABSTRACT

A vibration isolation mount pad insert for supporting heavy equipment wherein the insert is vertically adjustable and a constant horizontal natural frequency is maintained at all vertical positions of the pad. The constant horizontal natural frequency vibration absorption characteristics are maintained at all insert positions by shaping the insert elastomeric body. Constant horizontal vibration control is achieved by maintaining a constant effective elastomeric vibration control mass at all positions of vertical adjustment.

5 Claims, 1 Drawing Sheet

CONSTANT HORIZONTAL NATURAL FREQUENCY VIBRATION ISOLATION MOUNT PAD INSERT

BACKGROUND OF THE INVENTION

1. Field of the Invention

The invention pertains to vibration absorbing mount pad inserts for heavy equipment wherein the insert is capable of vertical adjustment.

2. Description of the Related Art

It is often desirable to support heavy equipment such as machine tools, presses, turbines, generators, and other heavy dynamic equipment on frequency vibration absorbing pads, such pads usually being of an elastomeric type. As such equipment often must be vertically adjusted at the various legs or points of support for leveling and alignment purposes, various types of leveling devices are often used with the mounting pads, such as threaded stems, wedges, or the like.

It is common to mount the isolation pad insert within a cavity defined within the frame leg or mounting component. Such use of a cavity minimizes the overall height of the supported equipment, protects the mounting pad insert, and is aesthetically preferable. However, when an elastomeric vibration absorbing mounting pad insert is located within the frame cavity, horizontal expansion of the pad elastomeric material often causes the elastomer to engage the sides of the cavity increasing the mass of elastomer which is absorbing horizontal vibrations and as the mass of elastomer engaging the frame cavity will vary according to the vertical position of the pad insert within the cavity, it is not possible to maintain the predetermined constant horizontal frequency vibration characteristics desired. The invention solves this problem.

OBJECTS OF THE INVENTION

It is an object of the invention to provide a vertically adjustable isolation mount pad insert which provides a constant horizontal natural frequency absorption irregardless of the vertical location of the pad within a frame cavity receiving the pad.

Another object of the invention is to provide a constant horizontal natural frequency vibration isolation mount pad insert which is economical to produce, effective in operation, and does not require installation by highly skilled personnel.

SUMMARY OF THE INVENTION

A constant horizontal natural frequency vibration insulation mount pad insert in accord with the inventive concepts consists of an elastomeric body having a vertical dimension. The body is, preferably, of a rectangular configuration having upper and lower regions defined by parallel lateral sides and parallel ends. The peripheral dimension of the upper region of the elastomeric body is greater than the peripheral dimension of the body lower region.

A rigid core plate of steel is located within the elastomeric body adjacent the body upper surface for the purpose of engagement with an adjustment screw mounted in the frame of the equipment being supported.

The equipment being supported includes a cavity of a horizontal cross sectional configuration complementary to the horizontal cross sectional configuration of the mount pad insert, and the sides defining the cavity are of a dimension substantially equal to the peripheral dimensions of the elastomeric body upper peripheral region. Thus, the body will be snugly received within the frame cavity with the elastomeric material of the body upper region engaging the frame cavity walls.

The core plate is in horizontal alignment with the elastomeric body upper region and is of a peripheral configuration similar to the peripheral configuration of the insert pad upper region, but of a lesser dimension. Accordingly, elastomeric material is interposed between the adjacent edges of the core and the pad insert, and preferably, the horizontal dimension of the elastomeric material in alignment with the core throughout the pad insert periphery is substantially equal throughout the pad insert upper region.

A threaded screw extending through a threaded hole in the equipment frame engages the mount pad core plate whereby the weight supported by the insert pad is applied to the pad through the screw. In turn, the forces applied to the core plate are transferred to the elastomeric material of the pad body. Several thousands of pounds may be supported by an insert pad causing the elastomeric material to flow horizontally due to the confinement by the core plate, and the elastomeric material in horizontal alignment with the core plate will be "compressed" between the core plate and the frame cavity sides. As the characteristics of the elastomeric material and the dimension of the pad body upper region are predetermined, the amount of elastomeric material engaging the cavity sides is known as is the amount of elastomeric material mass located between the cavity sides and the core plate. Thus, by predetermining these characteristics, the natural horizontal vibration frequency of the equipment supported can be controlled.

Due to the high vertical forces imposed upon the insert pad insert, there is a tendency for all of the elastomeric material to flow horizontally, the lower region as well as the upper region of the pad. If the elastomeric material in the lower region of the insert engages the frame cavity sides under high compression and flow, the horizontal vibration absorption characteristics of the insert pad will be changed due to this engagement between the elastomeric material and the supported frame. In such instance, the horizontal vibration absorbing characteristics of the insert will vary in accordance with the vertical position of the pad within the frame cavity, and of course, such uncontrolled characteristics of the insert are highly objectionable and destroy the pre-tuned vibration damping characteristics of the insert.

In order to prevent the above occurrence, the lower region of the mount pad insert is of a lesser circumferential dimension than the mount pad upper region in horizontal alignment with the core plate. By making the insert lower region of a smaller diameter than the dimensions of the frame cavity, horizontal expansion of the elastomer under load will not cause the lower region elastomer to engage the frame cavity sides, and regardless of the vertical position of the insert within the frame cavity, the predetermined amount of elastomer designed to absorb horizontal vibrations will be maintained. Accordingly, the mount pad insert of the invention is capable of maintaining its predetermined vibration absorbing characteristics at all vertical positions and loadings of the mount pad.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
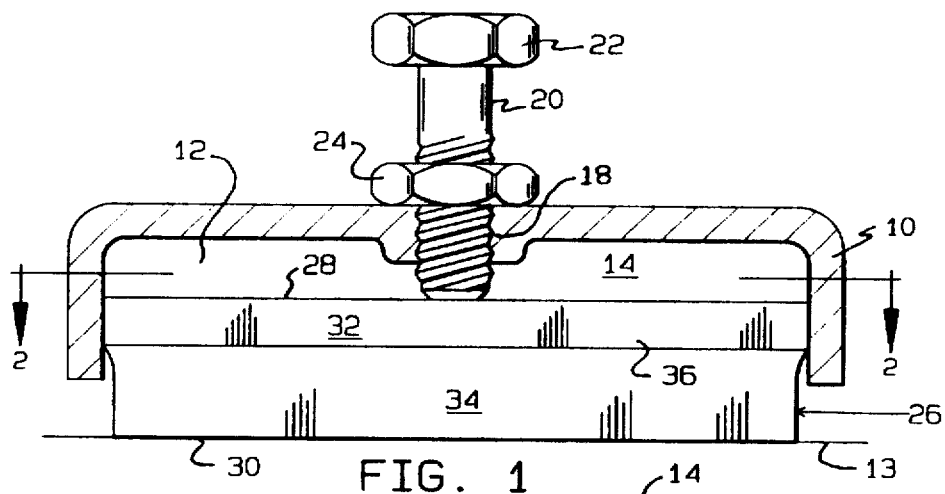
FIG. 1 is a side elevational view, partially sectioned, of a mount pad insert in accord with the invention capable of producing a constant horizontal natural frequency vibration isolation.

In the drawings, the frame mount pad of the equipment or apparatus being supported by the mount pad insert is represented at 10. The apparatus being supported will usually be heavy duty dynamic equipment such as machine tools, stamping presses, motors, generators, turbines, and the like. The frame pad 10 may constitute a column, leg, or other supporting element for such equipment, and the pad will usually be formed of steel or cast iron and includes a cavity 12 which, in the disclosed embodiment, is of a rectangular configuration. As will be appreciated from FIG. 1, the cavity 12 is closed by the frame at its upper region, and is open to the supporting surface 13, FIG. 1, such as the floor or other mounting structure capable of supporting the apparatus. Of course, the supported apparatus will include a plurality of frame supporting pads 10, and these supporting pads may be identical to that represented in the drawings.

Figure 2:
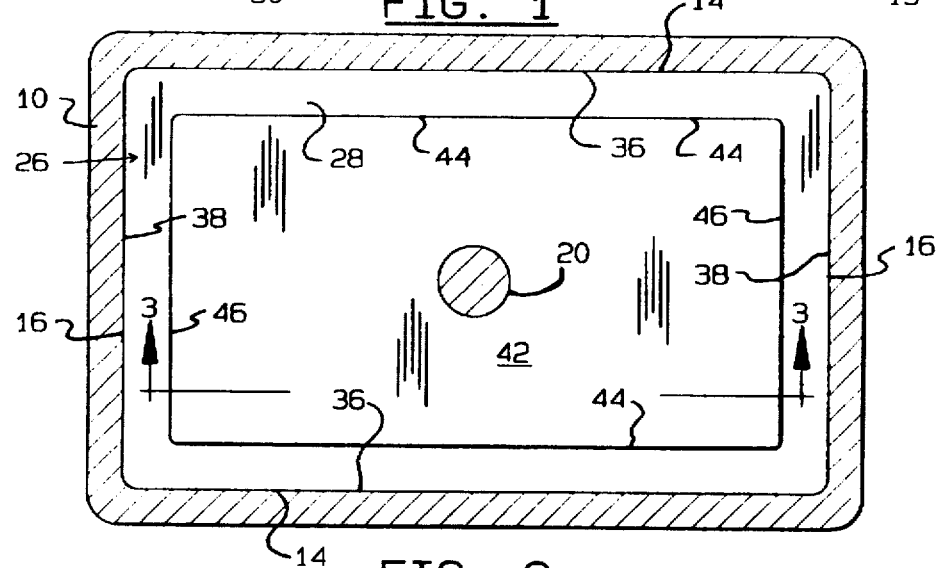
FIG. 2 is a plan sectional view illustrating the configuration of the frame cavity and insert pad as taken along Section 2—2 of FIG. 1.

The rectangular cavity 12 includes parallel longitudinal sides 14, FIG. 2, and parallel end sides 16 which define the internal circumference or inner periphery of the cavity 12. A threaded hole 18 extending through the upper panel of the frame 10 receives the threaded screw 20 having the hexagonal head 22, and the axial position of the screw 20 within the hole 18 may be locked by the lock nut 24 which will bear against the frame 10, FIG. 1.

The pad insert 26 constituting the subject matter of the invention consists of an elastomeric body adapted to be located within the frame cavity 12. The elastomeric pad insert body may be formed of a variety of elastomeric materials, such as rubber, neoprene, polyurethane, etc., the material requirement being its ability to absorb vibration and effectively support heavy weight under compression.

The pad insert body 26 includes an upper surface 28, a lower flat surface 30 adapted to engage the supporting surface 13, an upper peripheral region 32 and a lower peripheral region 34. The upper peripheral region 32, as is the lower peripheral region, is of a rectangular configuration and includes parallel longitudinal sides 36 and parallel ends 38, FIG. 2. The dimension of the upper peripheral region 32 is such as to be snugly received within the frame cavity 12, as will be appreciated from FIG. 2. The cavity sides 14 engage the insert pad sides 36, and the cavity ends 16 engage the insert pad ends 38.

Figure 3:
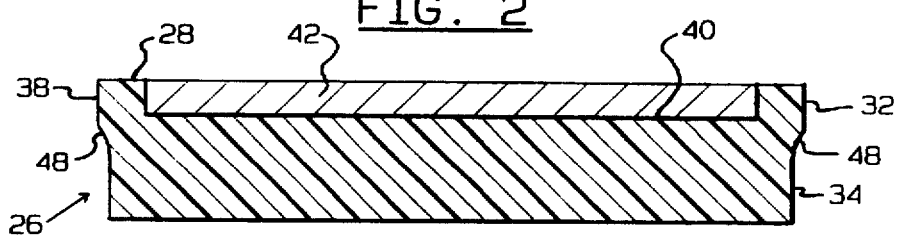
FIG. 3 is an elevational sectional view of the mount pad insert as taken along Section 3—3 of FIG. 2.

A recess 40 is defined in the upper region of the insert pad 26 intersecting the upper surface 28 as will be appreciated from FIG. 3. The recess 40 is of a rectangular configuration corresponding to the peripheral configuration of the insert pad upper region 32 as will be appreciated from FIG. 2. A rectangular rigid steel core plate 42 is snugly received within the recess 40, FIGS. 2 and 3. The core plate 42 closely conforms to the configuration of the recess 40, and the core plate may be bonded to the elastomeric material of which the recess 40 is formed or the core plate may be molded into the insert plate, or otherwise may be maintained therein. In actual practice, the core plate 42 may merely be resting within the recess 40 as the weight imposed thereon by the frame 10 will maintain the assembly between the core plate and the insert pad.

The peripheral dimension of the insert lower region 34 is less than the peripheral dimension of the pad upper region 32, and accordingly, the longitudinal sides and ends defining the lower region 34 will be set inwardly from a vertical projection of the upper region sides 36 and ends 38. Radii 48 defined in the elastomer material at the transition between the upper peripheral region 32 and the lower peripheral region 34 prevent stresses from occurring in this transition region.

In use, the insert 26 is located within the frame cavity 12 as illustrated. Because the insert sides 36 will engage the cavity sides 14, and the ends 38 will engage the cavity ends 16, the insert will be accurately located within the cavity 12. The screw 20 will be threaded into the hole 18 sufficiently such that the lower end of the screw will engage the steel core plate 42 as shown in FIG. 1. Accordingly, the screw 20 will determine the vertical location of the insert 26 within the cavity 12. The vertical height of the insert is greater than the vertical dimension of the cavity 12 such that the insert lower surface 30 will extend below the frame 10 for engagement with the supporting surface 13. Accordingly, the weight of the frame 10 is transferred through the screw 20 to the insert 26 via the core plate 42, and in this manner, the elastomeric material of the insert 26 will support the frame weight.

The elastomeric material of the insert 26 insulates the frame 10 from the floor 13 and absorbs and dampens vibrations incurring in the frame 10 generated by the apparatus, not shown, mounted upon the frame. While the insert sides 36 and ends 38 directly engage the sides of the frame cavity, elastomeric material mass is present between the core sides 44 and the frame sides 14, FIG. 2, and the core ends 46 and the frame cavity ends 16. This elastomeric material permits horizontal vibrations within the frame 10 to be damped and absorbed, and by predetermining the thickness of the elastomer material between the insert sides 36 and the core sides 40 and the insert ends 38 relative to the core ends 46, the natural frequency of the frame 10 in a horizontal direction can be effectively controlled.

In addition to predetermining the horizontal "thickness" of the amount of elastomer horizontally aligned with the sides and edges of the core plate, the vertical thickness of the upper region 32 also controls the amount of elastomer effectively damping the horizontal vibrations within the frame 10.

As will be best appreciated from FIG. 3, the vertical dimension of the core plate 42 is substantially equal to and horizontally aligned with the vertical dimension of the insert upper region periphery 32, and in this manner, the horizontal natural frequency vibrations of the frame 10 are effectively damped by the elastomeric material of the insert.

For leveling purposes, it is usually desired to vertically position the insert 26 within the frame cavity 12, and such leveling is readily produced by unloosening the lock nut 24 and rotating the screw 20 through the hexagonal head 22. Accordingly, as the amount of elastomeric material within the insert 26 damping horizontal frequencies remains constant regardless of the vertical positioning of the insert within the cavity 12, the natural frequency vibration isolation characteristics of the insert remain constant regardless of the vertical position of the insert in the frame cavity.

The lesser peripheral dimension of the insert lower region 34 is sufficient to prevent the elastomeric material within the insert lower region from engaging the cavity sides 12 and ends 16 regardless of the vertical forces supported by the insert within its designed limits. Of course, the greater the vertical forces imposed upon the insert, the greater horizontal expansion of the elastomeric material in the lower region 34 due to the tendency for the elastomeric material to flow horizontally under compression.

Figure 4:
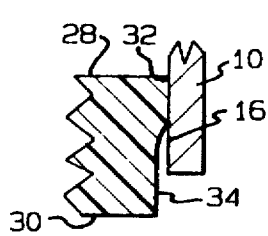
FIG. 4 is an enlarged detail elevational view of the mount pad upper and lower regions and cavity side wall under low load support conditions.

In FIG. 4, a typical relationship between the insert pad lower region 34 and the frame cavity sides is shown, and the clearance between the lower region 34 and cavity end 16 prevents the elastomeric material within the insert lower region 34 from engaging the frame ends or sides and changing the horizontal vibration absorbing characteristics of the insert.

Figure 5:
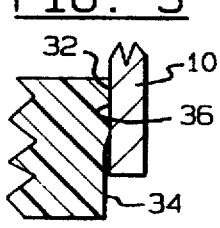
FIG. 5 is a view similar to FIG. 4 illustrating the relationship of the mount pad insert and frame cavity side wall under high load bearing conditions.

In FIG. 5, a relationship between the insert lower region 34 and the frame cavity end surfaces 16 is shown wherein the insert is under greater compression than is the case in FIG. 4, and the spacing between the lower region 34 and the frame end 16 is less than in FIG. 4. However, it is important that the original dimensioning of the insert 26 is such that even under the maximum designed load bearing characteristics of the insert that the elastomeric material of the lower region 34 does not engage the frame cavity sides or ends, as such engagement would seriously affect the predetermined horizontal vibration frequency isolation absorbing characteristics of the insert.

Figure 6:
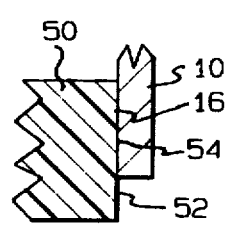
FIG. 6 is an elevational enlarged detail view of a prior art insert pad and frame cavity side wall wherein the insert pad does not utilize the inventive concepts and the insert pad is under a weight supporting condition.

FIG. 6 illustrates the type of situation avoided by the insert of the invention. In FIG. 6, the insert 50 is of a substantially constant dimension throughout its height. Accordingly, under load the vertical dimension of elastomeric material engaging the frame cavity end 16, as represented at 54, will vary according to the vertical position of the insert 50. As the vertical dimension of the contact area 54 changes as the vertical position of the insert is adjusted, the horizontal vibration absorbing characteristics of the insert 50 will change, and also, as the load on the insert 50 increases, the outer side 52 of the insert pad is forced into engagement with the frame cavity sides to a greater extent increasing the frictional engagement therewith and further affecting the frequency absorbing characteristics of the elastomeric material of the insert 50 in the horizontal plane. An insert constructed in the manner shown in FIG. 6 cannot maintain a constant horizontal natural frequency vibration isolation regardless of its vertical positioning within the cavity frame.

It will be appreciated that with the practice of the inventive concept, a constant horizontal natural frequency vibration isolation mount pad insert is achieved in an economical manner, and it is appreciated that various modifications to the inventive concepts may be apparent to those skilled in the art without departing from the spirit and scope of the invention.

We claim:

1. In combination, a vertically adjustable vibration isolation mount pad insert having a constant horizontal natural frequency and a mount pad having a cavity having a lower open end and defined by vertical wall surfaces defining an inner periphery, said mount pad insert comprising a rigid core having end and side edges defining a periphery and a lower side and an upper side, said mount pad insert further comprising an elastomer body mounted on said core having an upper side, a lower side, a first upper periphery and a second lower periphery, a recess defined in said elastomer body adjacent said upper side of the elastomer body of a peripheral configuration complementary to said periphery of said rigid core, said core being received within said recess, said elastomer first upper periphery being in horizontal alignment with said core and corresponding to the configuration of said mount pad cavity inner periphery, said elastomer first upper periphery engaging said vertical wall surfaces of said mount pad, said elastomer body including a predetermined dimension of elastomeric material located between all locations of said core periphery and said first upper periphery, said elastomer body second lower periphery extending from said cavity lower open end and having a peripheral dimension that is less than a peripheral dimension of said first periphery such that a lower portion of said elastomer body is sufficiently spaced at all locations from said mount pad cavity vertical wall surfaces to prevent engagement of said lowe portion of said elastomer body therewith when said first periphery has been replaced with the phrase when said elastomer body is vertically loaded whereby horizontal vibrations are damped solely through said elastomer first upper periphery in engagement with said vertical wall surfaces of said mount pad.

2. The combination claim 1 wherein, said first and second peripheries of said elastomer body being of rectangular horizontal cross section.

3. The combination of claim 2 wherein, said mount pad insert core being of a horizontal rectangular configuration complemental in shape to, said core and first periphery each having horizontal dimensions and including parallel longitudinal sides and parallel ends, said sides and said ends, respectively, of said core and first periphery being parallel, the corresponding horizontal dimensions of said core being less than the corresponding horizontal dimensions of said first periphery whereby an intermediate horizontal dimension of elastomer exists between all adjacent core and first periphery sides and ends, respectively.

4. The combination of claim 3 wherein all of said intermediate horizontal dimensions of said elastomer are equal.

5. The combination of claim 1 wherein said core is bonded within said recess.

\* \* \* \* \*